Figure 4:
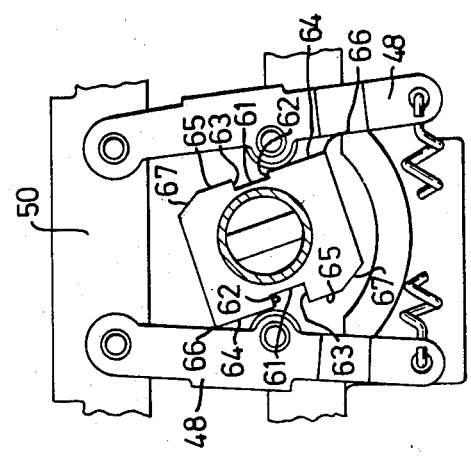

United States Patent [19]

Gens

[11] 4,299,135
[45] Nov. 10, 1981

[54] DEVICE IN A GEAR SELECTION MECHANISM FOR A MANUAL VEHICLE TRANSMISSION

[75] Inventor: Tore T. Gens, Jönköping, Sweden

[73] Assignee: H. Albihns Patentbyra AB, Stockholm, Sweden

[21] Appl. No.: 100,878

[22] Filed: Dec. 6, 1979

[30] Foreign Application Priority Data

Dec. 7, 1978 [SE] Sweden .............................. 7812589

[51] Int. Cl.³ .......................... G05G 5/06; G05G 9/18
[52] U.S. Cl. ................................... 74/475; 74/473 R; 74/527
[58] Field of Search .............. 74/475, 476, 527, 473 R

[56] References Cited

U.S. PATENT DOCUMENTS

| | | | |
|---|---|---|---|
| 3,106,851 | 10/1963 | Ivanchich | 74/475 X |
| 3,513,717 | 5/1970 | Lickey et al. | 74/475 X |
| 4,174,644 | 11/1979 | Nagy et al. | 74/475 X |

FOREIGN PATENT DOCUMENTS 2023762 12/1971 Fed. Rep. of Germany.

1090396 10/1954 France ................................ 74/527

*Primary Examiner*—Allan D. Herrmann
*Attorney, Agent, or Firm*—Cushman, Darby & Cushman

[57] ABSTRACT

A device for indicating gear positions in a gear selection mechanism for a manual vehicle transmission, preferably a transmission with four or more forward speeds. In the mechanism, a gear change lever is spherically mounted relative to the vehicle, and a gear change shaft is articulatedly connected to the gear change lever so as to convert lever movements during gear changing to angular and axial movements of the gear change shaft. When changing gears to and from a neutral position, such movements are divided into a selector step and an engaging or disengaging step, or vice versa. A first means of the gear change shaft coacts under spring bias with at least one second means of a bracket mounted in the vehicle. This coaction only has one stable position which corresponds to a given neutral position for the gear change lever. During the selector step the spring bias strives to return the first means to the stable position, thus indicating the gear position of the gearchange lever.

5 Claims, 4 Drawing Figures

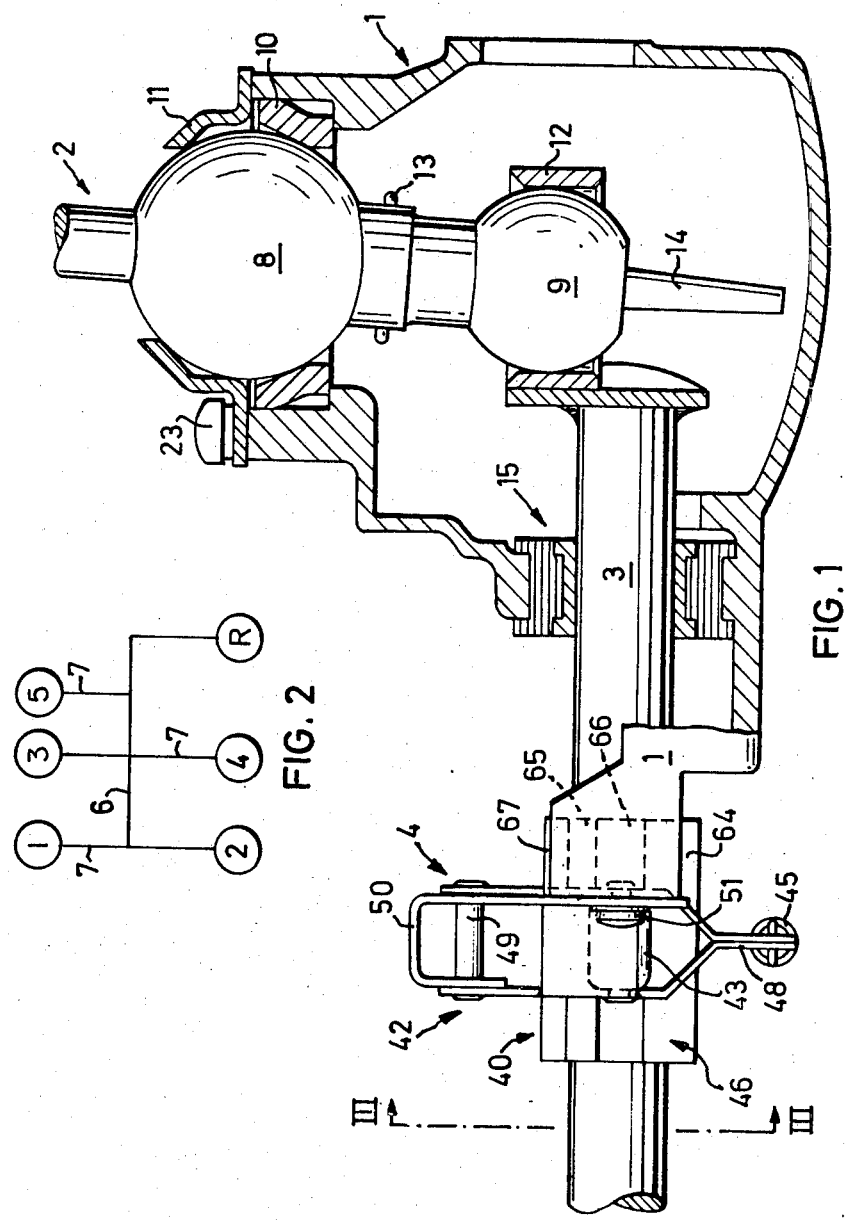

DEVICE IN A GEAR SELECTION MECHANISM FOR A MANUAL VEHICLE TRANSMISSION

The present invention relates to a device for indicating gear positions in a gear selection mechanism for a manual vehicle transmission.

In gear selection mechanisms operable by a gear change lever, a gear change movement to and from a neutral position where the gears are disengaged can be divided into a selector step and a disengaging or engaging step, or vice versa. During manual changing of gears in a vehicle transmission, especially in passenger cars, wrong changes are sometimes made as a result of the driver not being able clearly to distinguish between the different gear positions when operating the gear change lever. For example, in a passenger car having a four speed transmission where the gear positions are located according to the customary H-pattern, first gear can easily be confused with third gear and second gear with fourth gear.

To make better distinction between the gear positions, it is known in gear selection mechanisms for transmissions with three or four forward speeds to let the lower part of the gear change lever work directly or indirectly against the bias of a spring during the selector step, whereby the gear change lever automatically assumes neutral position when no gear is engaged. Such a construction is not applicable to transmissions with more than four forward speeds, since such transmissions require a gear position pattern other than the conventional H-pattern for four speed transmissions.

The present invention relates to a simple device for indicating gear positions in a gear selection mechanism for a manual vehicle transmission. It is also possible to utilize said device in vehicle transmissions with more than four forward speeds. More exactly, the invention refers to a gear selection mechanism comprising a gear change lever spherically mounted in a mounting fixed to the vehicle and a gear change shaft articulatedly connected to the lever, such that the gear change shaft, when rotated and axially displaced, transfers gear change lever movements for engaging and disengaging gears in a transmission, whereat a gear changing movement to and from a disengaged neutral position can be divided in a known way into a selector step and an engaging or disengaging step, or vice versa. The inventive device is essentially distinguished in that it comprises a first means non-rotatably fixed to the gear change shaft, and at least a second means fixed to the vehicle, either of said means having a profiled contact surface which is engaged under spring bias by at least one element mounted on the other of said means, the first means assuming a stable position relative to the other means only in a position corresponding to the neutral position of the gear change shaft, and that during selector steps for the gear selection mechanism the first means assumes instable positions relative to the second means, in which positions the spring bias strives to return the first means to a position corresponding to the neutral position of the gear change shaft, so that a driver operating the vehicle gear change lever is informed about the gear positions by subjectively feeling required operation forces.

A favourable form of the inventive device is distinguished in that the first means connected to the gear change shaft is formed as a guide abutment with at least one profiled engagement surface against which a contact roller or the like on the second means engages under spring bias. The device is further distinguished in that the profiled engagement surface on the guide abutment is formed with a central groove running along the gear change shaft for engagement by the contact roller on the second means. A gear change shaft position thus defined constitutes the neutral position of the gear selection mechanism and in a normal gear position corresponds to the engaging position for third and fourth gear.

The guide abutment can be mounted at an optional position along the gear change shaft, and thus the inventive device does not need to affect the construction of the gear change lever mounting. Since the device comprises two mutually opposed means under spring bias, adaption of the inventive device to gearboxes with more than four forward speeds is enabled by a suitable configuration of the engagement surface.

Figure 3:
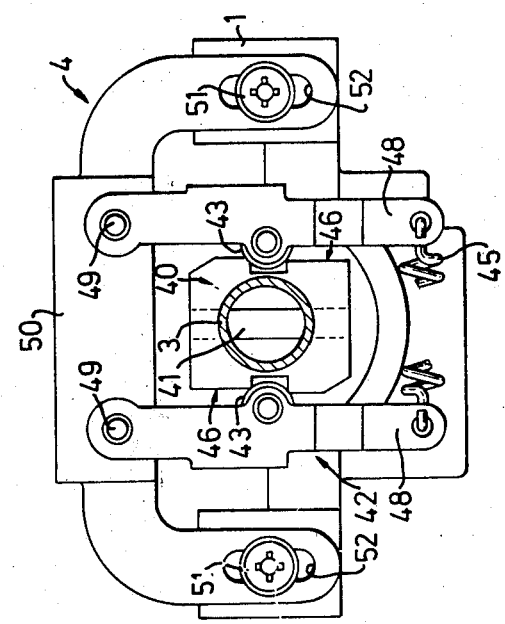

Other distinguishing features of the invention are apparent from the accompanying claims and from the description hereinafter of an advantageous embodiment of the invention. The description is made with reference to the attached drawings, on which FIG. 1 is an axial view of a gear change shaft, and with a partial section of a gear change lever housing, illustrating a part of a gear selector mechanism, FIG. 2 illustrates a gear position diagram for a five speed vehicle transmission, FIG. 3 is a cross section along the line III—III in FIG. 1, with the gear change shaft assuming neutral position, and FIG. 4 illustrates in the same way the gear change shaft assuming an engaged gear position.

The gear selector mechanism according to FIG. 1 comprises a gear change lever housing 1 fastened by means (not shown) to the floor between the front seats in a passenger car. A gear change lever 2 is mounted in the housing 1, the upper end of the gear change lever (not shown) being intended for actuation by the car driver for manually changing gears in the car transmission (not shown). At its lower end, the gear change lever 2 is articulatedly connected to a gear change shaft 3 for transmitting gear change lever movements to the gearbox. The gear change shaft 3 is adapted for coaction with an inventive guide means 4 for defining or indicating different gear positions.

In the present embodiment the transmission is provided with five forward gears and one reverse gear, the positions of which are apparent from the gear change lever movement diagram according to FIG. 2. Relative to the longitudinal direction of the vehicle, the movements of the gear change lever 2 can be divided into lateral movements, so-called selector steps, along the line 6, and longitudinal movements, so-called engaging and disengaging steps, along the lines 7.

The bottom portion of the gear change lever 2 is provided with an upper ball 8 and a lower ball 9, respectively. The gear change lever 2 is spherically mounted via the upper ball 8 in a spherical bearing cup 10 mounted in the gear change lever housing 1. A bearing cover 11, which is screwed to the gear change lever housing 1 by means of screws 23 (only one shown), forms the upper part of the bearing and prevents the gear change lever 2 from being lifted out of the gear change lever housing 1. The lower ball 9 is arranged to engage in a sleeve 12 welded to the end of the gear change shaft 3 above the centre line of the gear change shaft 3. The axial extension of the sleeve 12 is at right angles to that of the gear change shaft 3, thus providing for the transfer of the gear change lever 2 movements in two mutually perpendicular planes according to the diagram in FIG. 2 to the gear change shaft 3, so that the latter can perform a turning movement during the selector step 6 and an axial displacement movement during the engaging step 7.

To advantage, the two balls 8,9 constitute one unit of a plastics material, this unit 8,9 being fastened to the gear change lever 2 by means of a spring pin 13. The lower portion of the unit 8,9 is formed with an end finger 14 coacting with cam formations (not shown) or a gear position profile at the bottom of the gear change lever housing 1 to guide and limit the gear-changing movements.

The gear change shaft 3 is journalled in a vibration-insulating slide bearing 15 mounted on the gear change lever housing 1, this bearing allowing both axial and angular movements. A guide abutment 40 incorporated in the inventive guide means 4 is attached to the gear change shaft 3 outside the gear change lever housing 1. The abutment is substantially parallelepipedic and has a central through-hole for attaching to the gear change shaft 3 by means of a transverse spring pin 41 or the like. The abutment 40 is adapted for coaction with a position indicator 42 rigidly attached to the gear change lever housing 1.

As will be seen from FIGS. 3 and 4, each vertical side 46 of the abutment 40 is formed with a longitudinal central groove 61 with straight edge walls 62,63. One edge wall 62 is lower than the other edge wall 63, as a result of the distance between the vertical centre line of the abutment 40 and the vertical side plane 64 on one side of the groove 61 being smaller than the corresponding distance for the vertical side plane 65 on the other side of the groove 61. Those of the side planes 64,65 of the abutment which are situated diametrically opposite each other can be regarded as forming a coacting pair. One pair comprises the side planes 64, on one side limited by the lower edge wall 62 of the groove 61 and on the other side by the square corner 66 of the abutment 40. The other pair of side planes 65 is limited by the higher edge wall 63 of the groove 61 and by a chamfered corner portion 67 on the abutment 40.

Two guide rollers 43, incorporated in the position indicator 42, engage with spring bias against either side of the abutment 40, i.e. against the vertical sides 46, comprising the side planes 64,65 of the abutment. Each roller 43 is rotatably mounted on an arm 48 constituting a setting means in the inventive device. The arms 48 are pivotably mounted on pins 49 in a wishbone-shaped yoke 50 which is attached to the gear change lever housing 1 by means of screws 51. The screws 51 pass through vertical slots 52 in the yoke 50, enabling accurate adjustment of the position indicator 42. Between the lower free ends of the arms 48 there is a tension spring 45 keeping the rollers 43 in engagement against the guide abutment 40.

The abutment 40 as well as the rollers 43 are suitably made from a plastics material, e.g. an acetal plastics marketed under the trade name of Delrin.

In FIG. 3 there is illustrated the relative position prevailing between the abutment 40 and the rollers 43 when the gear change lever 2 and the gear change shaft 3 are in the neutral position, which corresponds in FIG. 2 to a position on the line 6 opposite the third and fourth gears. When changing into first or second gear from neutral, the gear change lever 2 is moved to the left for the selector step. The gear change shaft 3 will then be rotated anticlockwise, and the lower edge wall 62 in the grooves 61 will simultaneously force out the rollers 43 against the bias of the spring 45 to engage against the lower side planes 64, and this position is illustrated in FIG. 4. During the following engagement step, the gear change shaft 3 is displaced axially, the rollers 43 gliding against said side plane 64. The ends of the rollers 43 have a rounded shape to ensure good travel even if there is some angularity between the rollers 43 and the abutment 40.

When changing into third and fourth gear from neutral, only the engaging step needs to be performed, and this is done solely by applying a forward or rearward force on the gear change lever 2. The consequential axial movement of the gear change shaft 3 occurs with the rollers 43 gliding in the longitudinal grooves 61 of the guide abutment 40 in the relative position illustrated in FIG. 3.

When changing either into fifth or into reverse gear, the selector step is made to the right along the line 6 in the movement diagram according to FIG. 2. The gear change lever 2 movement to the right results in clockwise rotation of the gear change shaft 3 and abutment 40. The rollers 43 are thus urged to roll over the respective higher edge walls 63 and to engage against the higher side planes 65. The guide abutment 40 and rollers 43 thereby assume a relative angular position in a clockwise direction corresponding to the angular position in an anti-clockwise direction which is illustrated in FIG. 4. After said angular position has been assumed, the engaging step can be executed. If reverse gear is to be engaged, the rollers 43 will come on to the chamfered corner portions 67 during the selector step, before the engaging step can be executed.

When engaging the forward gears 1, 2 and 5 and reverse gear, the spring bias will act to urge the rollers 43 to assume the stable position in the grooves 61, i.e. the rollers 43 strive to return the gear change shaft 3 to its neutral position. The spring bias increases the more the guide abutment 40 is turned from the stable position, since the distance between the ends of the arms 48, and thereby the spring length, increases. By forming the edge walls 62, 63 of the groove 61 with different heights, the necessary force for carrying out a gear change will be dependent on which gear is to be engaged. Since it is generally easier for a driver to exercise a pushing force rather than a pulling force, said height difference can act compensatingly to a certain extent, so that the driver is given the subjective impression that substantially the same force must be exercised when engaging all the gears 1, 2 and 5. The configuration of the guide abutment in the illustrated embodiment relates to a left hand-drive car, whereas the height relationship between the side walls of the groove in a right hand-drive car is suitably the reverse.

Within the scope of the inventive concept and the following claims, the invention can assume a plurality of alternative embodiments. It is thus not inacceptable to arrange the rolling and/or gliding element 43 fastened to the gear change shaft 3, and the means 40 with the profiled engagement surface fastened to a fixed portion of the vehicle, either said element or said means being actuated by spring bias. The profiled engagement surface can furthermore be varied within wide limits with the object of obtaining a desired characteristic for the resistance to gear change lever movements. In the case where the means with the engagement surface is attached to the gear change shaft 3, the surface can be contoured for coaction with the rolling and/or gliding element together with a groove made in the gear change shaft 3, for example. Said element can be made up using rollers, balls or even an outwardly curved projection on a leaf spring. Neither is it necessary, as illustrated in the described embodiment, to double the rollers or corresponding elements, but in principle it is sufficient with one element coacting with a profiled surface.

What I claim is:

1. A device for indicating gear positions in a gear selection mechanism for manual vehicle transmission, said gear selection mechanism comprising a gear change lever spherically mounted in a mounting fixed to the vehicle, and a gear change shaft articulatedly connected to the gear change lever such that the gear change shaft, when rotated and axially displaced, transfers gear change lever movements for engaging and disengaging gears in a transmission, whereat a gear changing movement to and from a disengaged neutral position can be divided in a known way into a selector step and an engaging or disengaging step, or vice versa, characterized in that the device comprises a first means non-rotatably fixed to the gear change shaft, and at least a second means fixed to the vehicle, that either of said means has a profiled contact surface which is engaged under spring bias by at least one element mounted on the other of said means, that the first means assumes a stable position relative to the other means only in a position corresponding to the neutral position of the gear change shaft, and that during selector steps for the gear selection mechanism the first means assumes instable positions relative to the second means, in which positions the spring bias strives to return the first means to a position corresponding to the neutral position of the gear change shaft, so that a driver operating the vehicle gear change lever is informed about the gear positions by subjectively feeling required operation forces.

2. A device as claimed in claim 1, characterized in that the first means attached to the gear change shaft is formed as a guide abutment attached to the gear change shaft, with at least one profiled engagement surface against which a contact roller or the like, mounted on the second means, engages under spring bias.

3. A device as claimed in claim 2, characterized in that the profiled engagement surface on the guide abutment is formed with a centrally located, open groove in which the contact roller on the second means engages when the gear selection mechanism assumes neutral position.

4. A device as claimed in claim 3, characterized in that the guide abutment is formed with a profiled engagement surface on each of its two longitudinal vertical sides, and that said engagement surfaces diametrically have side planes which are alike in pairs.

5. A device as claimed in claim 4, characterized in that the second means comprises two arms pivotably mounted in a stationary bracket, one arm on each side of the guide abutment, said arms each carrying a contact roller which is mounted for rotation, and that between the lower free ends of the arms there is a tension spring biassing the two contact rollers into engagement against the guide abutment.

* * * * *

UNITED STATES PATENT AND TRADEMARK OFFICE
CERTIFICATE OF CORRECTION

PATENT NO. : 4,299,135

DATED : November 10, 1981

INVENTOR(S) : Tore Teodor Gens

It is certified that error appears in the above—identified patent and that said Letters Patent is hereby corrected as shown below:

On front page format:
Paragraph [73] should read:
  --Assignee:  Saab-Scania Aktiebolag,
              Sodertalje, Sweden--

Signed and Sealed this

Twenty-ninth Day of June 1982

[SEAL]

Attest:

Attesting Officer

GERALD J. MOSSINGHOFF

Commissioner of Patents and Trademarks